United States Patent [19]

Swinley

[11] 4,342,490
[45] Aug. 3, 1982

[54] BEARING ASSEMBLIES

[75] Inventor: George Swinley, Castleford, England

[73] Assignee: Ransome Hoffmann Pollard Limited, Chelmsford, England

[21] Appl. No.: 164,536

[22] Filed: Jul. 2, 1980

[30] Foreign Application Priority Data

Jul. 3, 1979 [GB] United Kingdom ............... 7923054
Mar. 4, 1980 [GB] United Kingdom ............... 8007379

[51] Int. Cl.³ .......................................... F16C 33/76
[52] U.S. Cl. ............................. 308/187.1; 308/187.2
[58] Field of Search ............... 308/187.1, 187.2, 36.1, 308/36.2, 188, 189 R, 198, DIG. 11; 220/306; 138/96 R; 277/212 C

[56] References Cited

U.S. PATENT DOCUMENTS 2,759,243  8/1956  Smith .................................. 308/198
4,229,059 10/1980  Dever ............................. 308/189 R
4,230,230 10/1980  Mumford ........................... 220/306
4,269,232  5/1981  Witschi ............................ 138/96 R

FOREIGN PATENT DOCUMENTS 1205886  9/1970  United Kingdom .
1558311 12/1979  United Kingdom .

Primary Examiner—Lenard A. Footland
Attorney, Agent, or Firm—Schwartz & Weinrieb

[57] ABSTRACT

A rolling-element bearing assembly has a cover fitted to one of the races. The cover is in the form of a cap provided with lugs or projections which extend axially and radially outwards from the peripheral edge of the open end of the cap. The lugs of projections have lips which engage in a groove in the associated bearing race. The cap is resiliently deformable to an extent which permits the easy release of the lips from the groove by manual squeezing of the cap. Conversely, the cap can be urged manually against the associated bearing race to cause the lips of the lugs or projections to engage in the groove in a snap-fitting action.

15 Claims, 8 Drawing Figures

BEARING ASSEMBLIES

FIELD TO THE INVENTION

The present invention relates in general to rolling-element bearing assemblies and, more particularly, to protective covers for use with such assemblies.

BACKGROUND OF THE INVENTION

As is described hereinafter, a bearing assembly constructed in accordance with the invention can be fitted to a cast housing or pillow block, such as a unit marketed under the trade name "Self-Lube". As is known, the outer bearing race then has a spherical outer exterior surface which seats in a spherical bore in the housing to permit the entire bearing to swivel in the housing, for example, to take up misalignment. Such units are widely used in many industrial applications, particularly in agricultural machinery and power transmissions. Usually, the inner bearing race is fitted onto a rotatable shaft or spindle by means of grub-screws. The inner bearing race is otherwise in axially sliding contact with the shaft and by release of the grub-screws, positioning adjustments and assembly is facilitated.

In common with other bearing assemblies, such units need rotating parts to be screened off for reasons of safety. Hitherto screens or shields have been fitted to the cast housing itself, such as, for example, disclosed in U.K. patent specification 1205886.

The latter conventional arrangement necessitates machining on the cast housing and assembly on the shield can be time consuming. Different housings need different shields, even if utilizing similar bearings, and hence a common shield of conventional type is not feasible.

OBJECTS OF THE INVENTION

An object of the present invention is to provide an improved bearing assembly and cover therefor.

SUMMARY OF THE INVENTION

According to the present invention, there is provided a bearing assembly composed of inner and outer races with rolling elements therebetween. One of the races has a groove therein and a cover is fitted to locate with the groove in said one race. The cover is in the form of a resilient hollow cap provided with projections or lugs disposed at the peripheral edge of the open end of the cap. These projections or lugs extend axially beyond the peripheral edge of the open end of the cap and have lips or the like which positively engage in the bearing race reception groove. The cap is then removable from and attachable to said one bearing race by resilient deformation of the cap.

In a presently preferred embodiment of the invention, two projections or lugs are formed around the cap at diametrically-opposed positions.

The cover or cap is resiliently deformable to an extent which permits the easy release of the lips from the groove by manual squeezing of the cap. Conversely, the cap can be urged manually against the bearing race to cause the lips of the lugs or projections to engage in the groove in a snap-fitting action.

The end of the cover remote from the open end may be closed or provided with an opening, sealed or otherwise, to accommodate a shaft projecting from the bearing.

The projections or lugs may be radially offset also from the peripheral edge of the open end of the cap.

In contrast to some prior art arrangements, the cover of the present invention can be easily and quickly fitted to the bearing itself and can thus be utilized with a variety of housing types fitted with the same size bearing. A range of covers of sizes commensurate with a corresponding range of bearing sizes can match a whole range of pillow blocks or flanged housing units. A cover constructed in accordance with the invention and fitted to the bearing of a unit is able to move with the bearing when misalignment or adjustment occurs and the bearing moves with the housing. The provision of the projections or lugs inhibits axial displacement between the cover and the bearing and is protection against normal vibration and shock force dislodgement. Besides performing a protective safety function, the cover, which is neat and simple, also protects the bearing itself from the ingress of dirt or other external substances.

The invention may be understood more readily, and various other features of the invention may become apparent, from consideration of the following description.

BRIEF DESCRIPTION OF DRAWINGS

Embodiments of the invention will now be described, by way of examples, with reference to the accompanying drawings, wherein.

DESCRIPTION OF PREFERRED EMBODIMENTS

Figure 1:
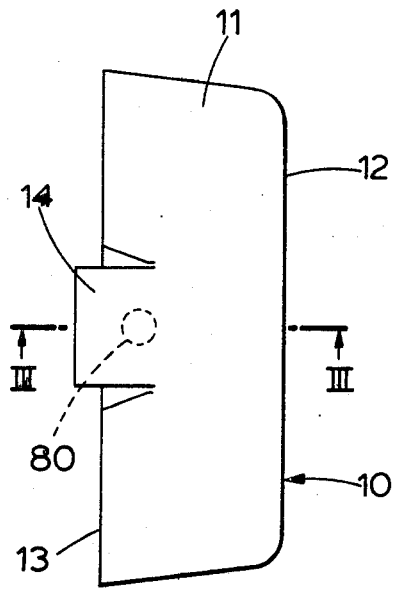
FIG. 1 is a side view of a cover used in assemblies made in accordance with the invention.
Figure 3:
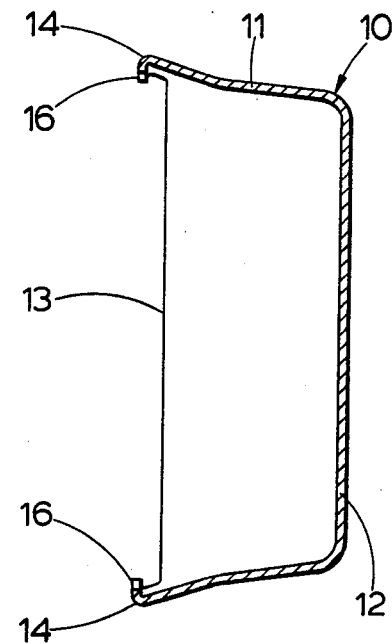
FIG. 3 is a sectional side view of the cover shown in FIGS. 1 and 2, the view being taken along the line III—III of FIG. 1.
Figure 2:
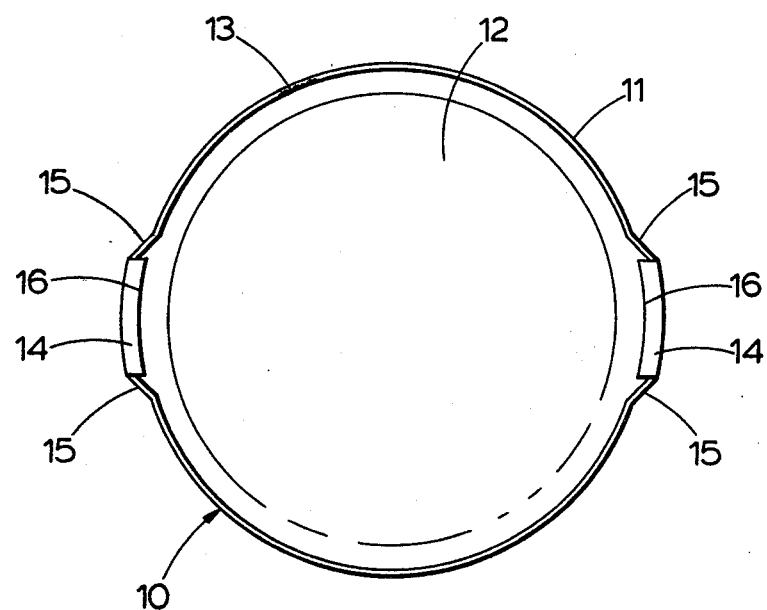
FIG. 2 is an end view of the cover shown in FIG. 1.
Figure 7:
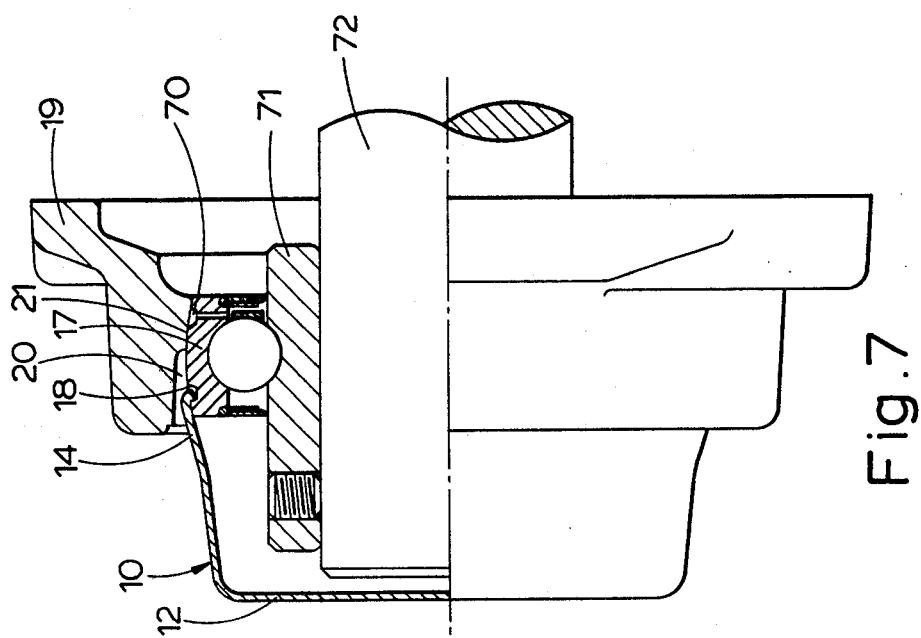
FIG. 7 is a part-sectional side view of a rolling element bearing incorporating the cover shown in FIGS. 1 to 3.

FIGS. 1 to 3 depict a cover 10 for use with a rolling-element bearing, such as that depicted in FIG. 7. The cover 10 is a one-piece cap of generally frusto-conical cup-like shape conveniently formed from pressed steel or other metal or formed from synthetic plastic material. The cover 10 has a main wall 11 merging with an end wall 12 at its narrowest end. The end wall 12 may be continuous, as shown, or provided with an opening to accommodate a shaft or spindle projecting from the associated bearing assembly. The opening in the end wall 12 may be plain with clearance in relation to the shaft or spindle or the opening may receive a seal for sealing with respect to the shaft or spindle. The opposite end 13 of the cover is open. The cover 10 is provided with gripping means in the form of a pair of diametrically-opposed projections or lugs 14. Each lug 14 has a radially inturned lip 16. The lugs 14 project axially and radially beyond the peripheral edge of the open end 13 and merge laterally with the main wall 11 via inclined wall regions 15 as seen in FIG. 2. The lugs 14 can be resiliently deformed outwardly to permit the cover 10 to be initially located onto the outer race of the bearing assembly. The cover 10 can then be urged axially inwardly to allow the lips 16 to become engaged in a reception groove in the outer race as a snap-fit.

Figure 8:
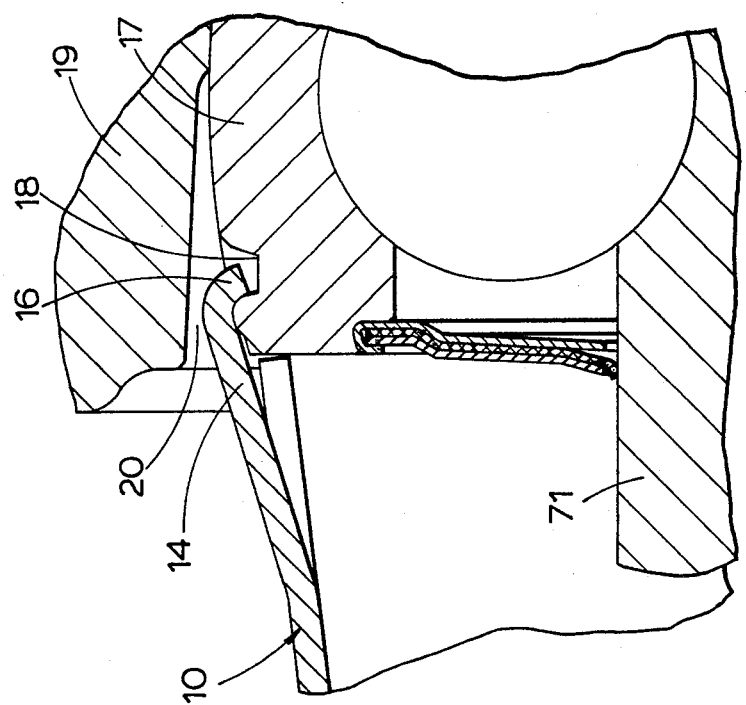
FIG. 8 is an enlarged sectional side view of part of the assembly depicted in FIG. 7 showing the engagement between the cover and the bearing race.

FIGS. 7 and 8 depict a typical bearing assembly fitted with the cover 10 where the outer bearing race is designated 17 and the reception groove in the race 17 is designated 18. The inner race of the bearing designated 71 is mounted on a shaft 72 and fixed thereto with grub-screws. During location of the cover 10 to the outer race 17 of the bearing assembly, the lugs 14 make sliding contact with the outer peripheral surface of the race 17 and this aligns the cover 10 axially centrally of the bearing assembly. When the lips 16 of the lugs 14 engage in the groove 18 to retain the cover 10, the cover 10 is maintained centrally. Accidental tilting or displacement of the cover 10 is resisted. Primarily, the cover 10 is retained axially and the cover 10 can move with the outer race 17 to cope with any angular swivelling of the bearing to accommodate misalignment or adjustment. To release the cover 10 pressure can be applied manually to the wall 11 to deform the cover 10 so that the lugs 14 move radially outwards to release the lips 16 from the groove 18.

The bearing assembly depicted in FIGS. 7 and 8 employs an outer race 17 with a spherical outer peripheral surface and is mounted in a similar bore 21 in a housing 19 as a unit marketed under the trade name "Self-Lube". As is known, the housing 19, fabricated as a casting, has diametrically-opposed recesses 20 in the main bore 21 which facilitate the assembly of the bearing to the housing 19 in a swivelling motion. The recesses 20 themselves accommodate the lugs 14 of the cover 10 so no adaptation of the housing 19 is needed. Nevertheless, if desired, additional recesses could be provided in the housing 19 to enable to cover 10 with a greater number of lugs 14 to be employed.

Instead of utilizing a bearing with a spherical outer peripheral surface as shown in FIG. 7, it is possible to employ a bearing with a non-spherical for example, plain outer surface.

Figure 4:
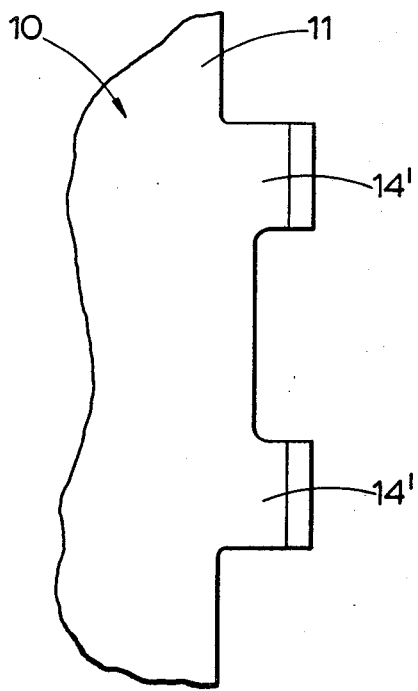
FIGS. 4 and 5 are scrap views which depict, on a larger scale, alternative lug configurations for the cover shown in FIGS. 1 to 3.
Figure 5:
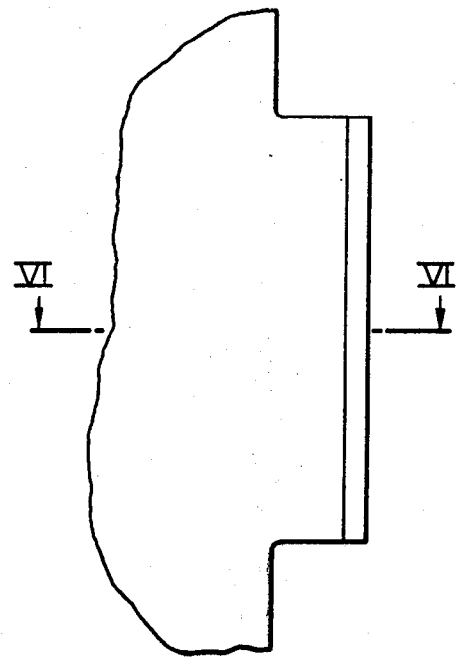
Figure 6:
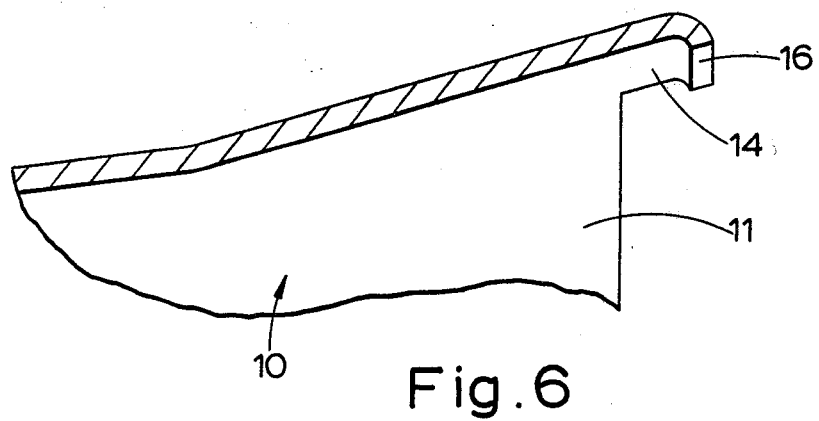
FIG. 6 is a sectional view taken along the line VI—VI of FIG. 5.

FIGS. 4 and 6 depict a somewhat different shape for the lugs 14 of the cover 10, while FIG. 4 depicts two circumferentially-spaced lugs 14' which can replace each one of the pair of lugs 14 in FIGS. 1 to 3.

Instead of locating with a groove 18 in the exterior of the outer race 17, the cover 10 can locate with a groove in the interior surface of this outer race 17. Inter alia, this may necessitate forming the projections or lugs 14 with outwardly facing lips 16 instead of inwardly facing lips 16 as shown and re-location of the bearing seal.

The reception groove 18 can be provided in a bearing race alone or in addition to a conventional groove for receiving grease. The provision of the latter groove is quite common where the bearing is itself retained in a housing and is illustrated in FIG. 7 of the drawings, at reference 70. In the case where the outer bearing race 17 has two grooves 18, 70 as illustrated, it is convenient to machine the cover-reception groove 18 and the grease groove 70 at symmetrical locations equi-distance from the side faces of the outer bearing race 17.

In another modification a small hole is additionally provided in the main wall 11 of the cover 10 or in one of the projections 14 as shown in FIG. 1 as dotted line reference 80. This enables a simple tool, such as a wire feeler, to be engaged with the cover 10 though the hole 80 to facilitate the removal of the cover 10 from the associated bearing where access is difficult. This modification is most useful where the bearing is located in the type of housing denoted 19 in FIGS. 1 and 8. It is useful to seal the hole 80 to prevent the ingress of dirt with the self-adhesive seal applied to the inside of the cover 10. The seal can then be broken with the tool or lifted and replaced when the cover 10 is to be re-used.

A further envisaged modification is to utilize a separate piece of strip material to form the projections or lugs 14 of the cover 10. Where the cover 10 is formed from a sheet metal pressing the strip may then be a resilient or springy steel strip, of U-shaped configuration which is fixed, for example, by spot welding to the interior of the cover 10. The projecting limbs of this steel strip then form the projections 14 with their lips 16 engageable in the reception groove 18 of the bearing race. The cover 10 itself would be provided with recesses in the open end 13 thereof which correspond with the strip projections and permit the latter to flex as desired.

Obviously, many modifications and variations of the present invention are possible in light of the foregoing teachings. It is therefore to be understood that within the scope of the appended claims, the present invention may be practiced otherwise than as specifically described herein.

I claim:

1. In a bearing assembly composed of inner and outer races with rolling elements therebetween in combination with a cover; the improvement comprising a reception groove provided in one of the bearing races and the cover is in the form of a resilient hollow cap provided with projections disposed at the peripheral edge of the open end of the cap, the projections extending axially beyond the peripheral edge of the open end of the cap and having lips which positively engage in the bearing race reception groove, the cap being removable from and attachable to said one bearing race by resilient deformation of the cap.

2. A bearing assembly according to claim 1, wherein the projections are also radially offset from the peripheral edge of the open end of the cap.

3. A bearing assembly according to claim 1, wherein the cap is at least partly of frustoconical shape.

4. A bearing assembly according to claim 1, wherein the end of the cap remote from said open end is closed with a closure wall.

5. A bearing assembly according to claim 1, wherein the end of the cap remote from said open end has a wall with an opening therein.

6. A bearing assembly according to claim 1, wherein there are two projections in diametrically opposed positions.

7. A bearing assembly according to claim 1, wherein the cap is fabricated from synthetic plastics material.

8. A bearing assembly according to claim 1, wherein the cap is a steel pressing.

9. A bearing assembly according to claim 1, wherein said one race is the outer race and the groove therein is provided in the exterior of said one race.

10. A bearing assembly according to claim 9, wherein the outer race is mounted in a housing.

11. A bearing assembly according to claim 10, wherein the inner race is mounted to a rotatable shaft.

12. A bearing assembly according to claim 11, wherein the exterior surface of the outer race is spherical.

13. A bearing assembly according to claim 11, wherein the housing is in the form of a pillow block.

14. A bearing assembly according to claim 1, wherein the cap is provided with a hole covered by a detachable seal which hole serves to receive a tool used to facilitate removal of the cap from the associated bearing race.

15. A bearing assembly according to claim 1, wherein the cap is a one-piece component.

* * * * *